April 30, 1940.  W. H. HECKMAN  2,198,615

JOURNAL BEARING

Filed Nov. 20, 1933   6 Sheets-Sheet 1

Witness:
N. B. Davison.

Inventor:
William H. Heckman
By attorney
Paul Carpenter

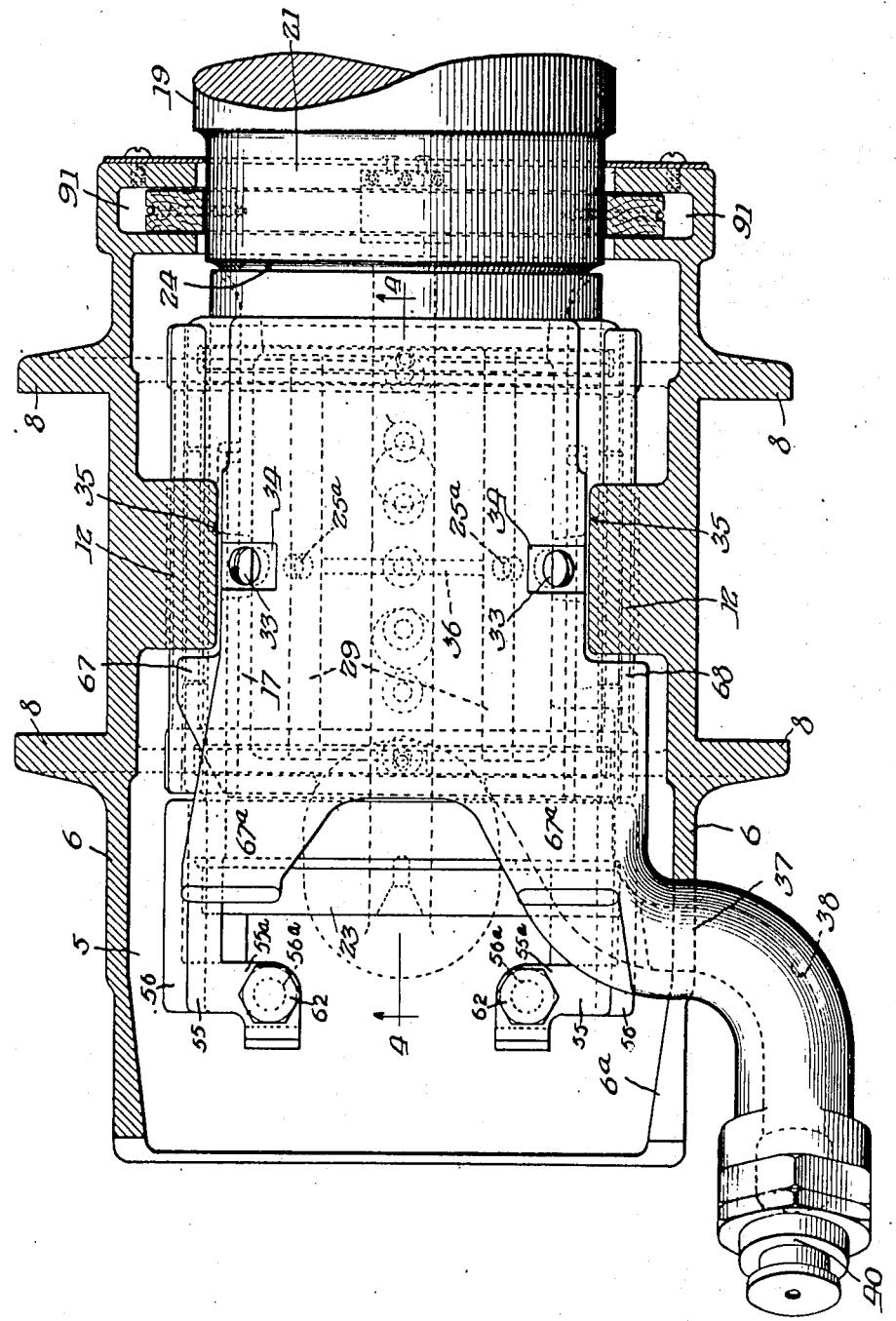

April 30, 1940. W. H. HECKMAN 2,198,615
JOURNAL BEARING
Filed Nov. 20, 1933 6 Sheets-Sheet 3
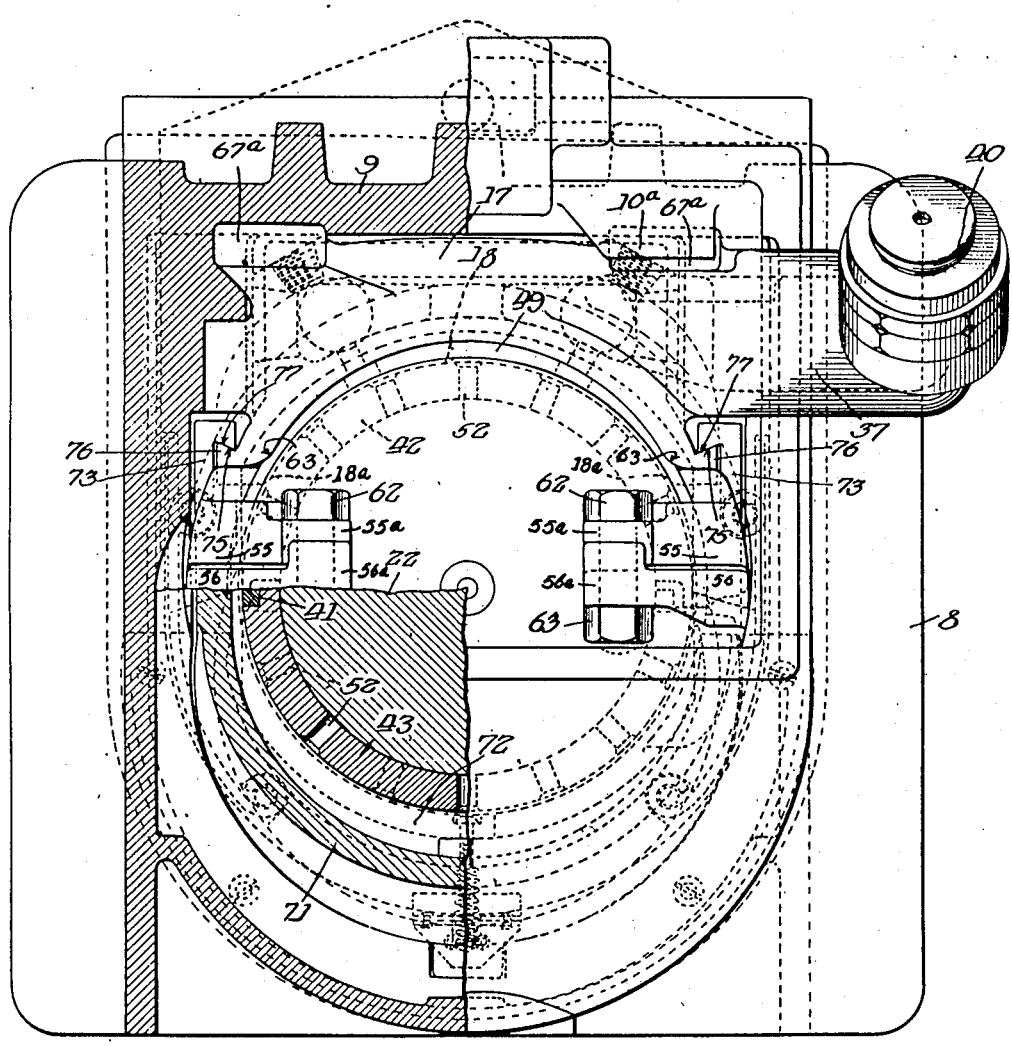

April 30, 1940.  W. H. HECKMAN  2,198,615
JOURNAL BEARING
Filed Nov. 20, 1933  6 Sheets-Sheet 4
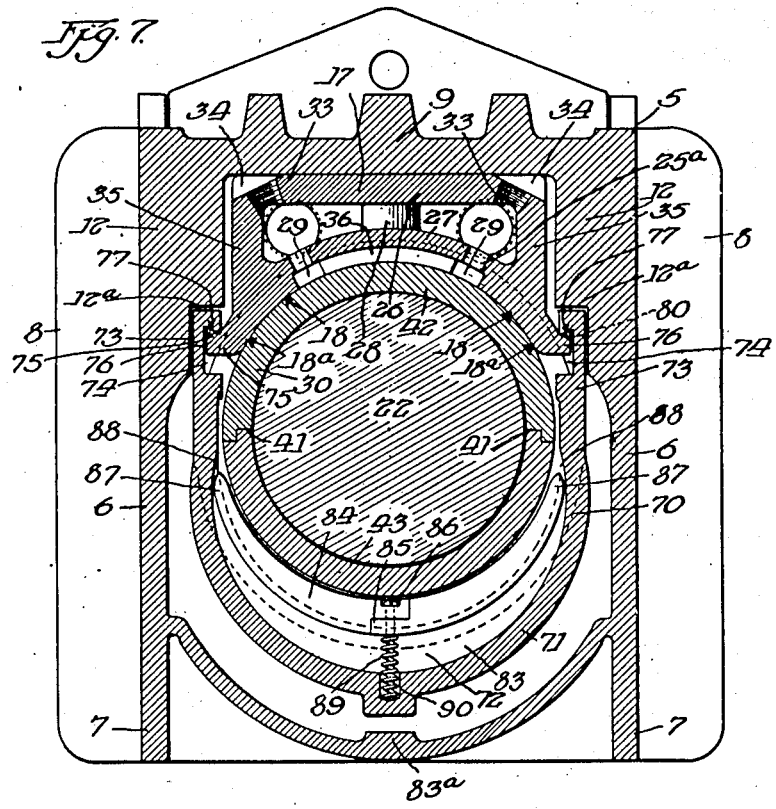
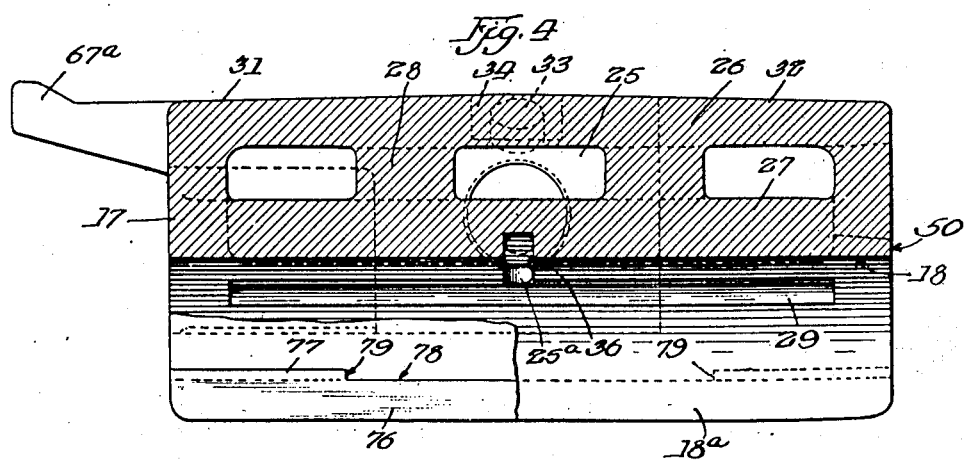
Witness:
R. B. Davison
Inventor:
William H. Heckman
by attorney
Paul Carpenter April 30, 1940.　　W. H. HECKMAN　　2,198,615
JOURNAL BEARING
Filed Nov. 20, 1933　　6 Sheets-Sheet 5
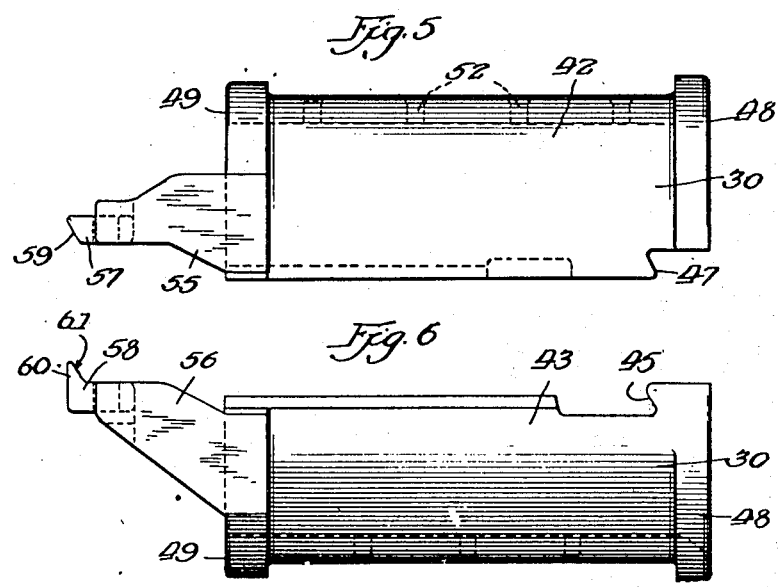

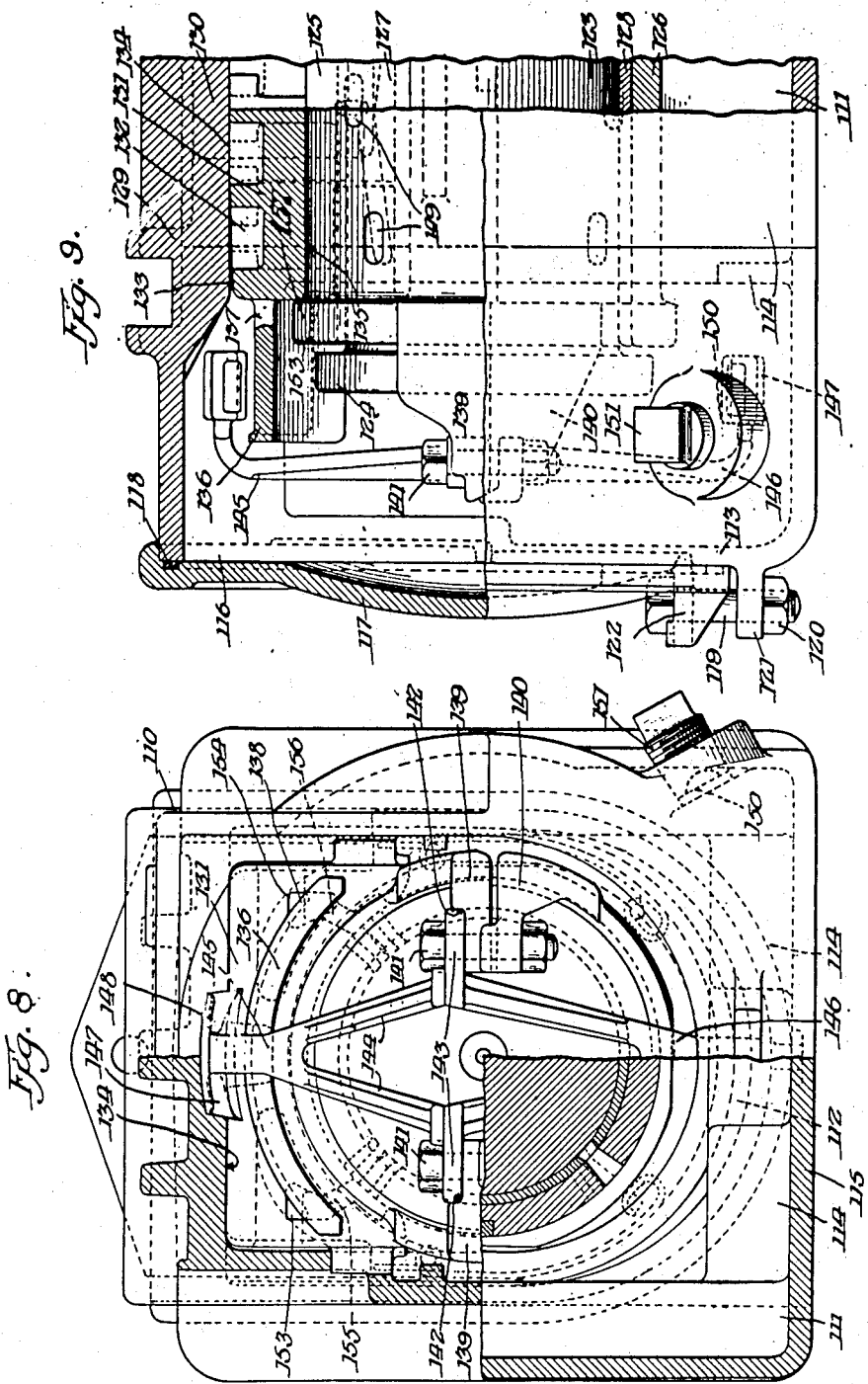

Patented Apr. 30, 1940

2,198,615

UNITED STATES PATENT OFFICE 2,198,615

JOURNAL BEARING

William Hunter Heckman, Chicago, Ill.

Application November 20, 1933, Serial No. 698,739

15 Claims. (Cl. 308—79)

This invention relates in general to improvements in journal bearings, and more particularly to improvements in the type of journal bearing especially adapted for use on railway rolling stock, and while the invention is illustrated and described as incorporated in a journal box and journal bearing for the axles of railway cars and the like, it will be understood that the invention may be employed for other analogous purposes.

The present existing type of railway journal boxes and journal bearings generally includes a box or housing open at one end to receive the journal below which a lubricant soaked packing of waste or other material is carried by the box, the other end of the box having a suitable cover permitting access to the interior thereof, a half or less bearing member being mounted in the top of the box and lying against the journal, a suitable keeper plate, commonly called a wedge being interposed between the said half-bearing, commonly termed a brass, and the top of the box. This type of bearing has been improved more or less in recent years by modified forms of lubricating systems, but owing to the trend toward higher speeds and greater loads, the possibility of hot bearings has been increased, due to low bearing area or surface producing increased friction per unit area and due to inadequate lubrication, or due to shreds of waste getting between the brass and journal and excessive friction between the journal collar and adjacent end of brass, such difficulties arising due to collar heat caused by wheel flange wear, which cannot be readily avoided in the prior art bearings. Such bearings require positive dependable lubrication in combination with a sufficient bearing surface to reduce the concentration of heat, and one of the objects of the present invention is to provide an improved bearing in which adequate and efficient lubrication may be assured with a desirable conservation of the lubricant at all times, in which an increased area of bearing surface is provided, which is constantly changed while the car or engine is in motion, so that with the thus increased area of bearing contact and constantly changing bearing surface I am enabled to provide a bearing which will operate over long periods of time with relatively little attention and yet will support heavy loads efficiently at high speeds. Furthermore, the nature of the bearing is such that its dimensions and the fact that it surrounds the journal serves to keep the journal in proper position with respect to wheel centers, since the bearing extends below the point at which the greatest thrust occurs and takes up this thrust and prevents the brass from raising away from the journal as now tends to occur in standard A. R. A. bearings.

The present invention has as further objects and advantages the provision of an improved floating bearing bushing for wheel journals, which is adaptable to existing journal boxes, so that the necessity for complete replacement of the existing journal boxes or axles, or of machine work or other change on axle journal or wheel hub is not necessary to the employment of my invention; and the provision of an improved bearing for journals in which the bearing elements, including the so-called wedge member and the floating bushing and lubricant housing or shield may be installed in and removed from the journal box, without the necessity of taking the box out of the truck frame, making the invention particularly useful in connection with freight car trucks; although it will be understood that the invention is useful on passenger car, engine front and trailer trucks or on the trucks of street railway, subway, elevated and other railway rolling stock; and the provision of an improved journal bearing in which a constant supply of adequate lubricant may be maintained at all times and in which lubricant may be, if desired, in some circumstances introduced under pressure to the surfaces of contact of the bushing, journal and supporting bearing.

This invention also contemplates the provision of an improved arrangement of the floating bushing whereby it may be adjusted upon installation to fit the journal; the provision of an improved shield to house the floating bushing to protect the same against the entrance of extraneous matter; the provision of an improved simplified means for supporting the shield from the wedge; the provision of an improved means for lubricating the journal and for retaining lubricant upon the rotating bushing; the provision of an improved construction of the shield including improved packing for retaining lubricant and excluding dust, thus permitting a larger inner opening to be provided in the box and facilitating installation and removal of the parts; the provision of an improved construction of the wedge and shield which allows greater clearance and thereby easier installation and removal of the parts in the standard journal box; the provision of an improved journal bearing in which the lubricant supplied to the journal bearing is retained by the rotatable bushing and in which a constant supply of lubricant is taken up by the bushing as it rotates for distribution over the entire surface of the journal and bearing; the provision of an improved journal bearing in which a relatively heavy lubricant known as hard grease may be employed initially forced under pressure to the wearing surfaces of the journal and bearing; the provision of an improved journal box of the character referred to in which the bearing surfaces are maintained in proper relative positions even when the car may be unloaded by car dumping means and in which this may be accomplished with a standard journal box without danger of loss of the lubricant; and the provision of an improved journal bearing in which the defects of the prior art bearings, such as collar heat and waste grabs are eliminated and which responds to all of the requirements of the A. R. A. and meets the requirements of modern fast freight or high-speed express passenger service.

This invention also includes improvements in means for lubricating the journal with a liquid lubricant, and therefore it is an additional object of the invention to provide a novel and improved arrangement of liquid lubricant feeding means operated by the bearing in service, to supply lubricant to the wearing surfaces.

The foregoing and such further objects and advantages as may appear or be pointed out as the description of this invention proceeds are illustrated in the accompanying drawings, of which:

Figure 2 is a plan view of the journal bearing with the journal box cut away along the line 2—2 of Figure 1, looking in the direction indicated by the arrows.

Figure 3 is a composite end elevation and vertical transverse sectional view, the parts being broken away to more clearly illustrate the same.

Figure 4 is an enlarged longitudinal sectional view of the bearing block or wedge, taken on the line 4—4 of Figure 2, looking in the direction indicated by the arrows.

Figures 5 and 6 are side elevational views of sections of the floating bushing.

Figure 7 is a vertical transverse sectional view taken on the lines 7—7 of Figure 1 looking in the direction indicated by the arrows.

Figure 8 is an end elevational view partly in section illustrating a further alternative form of the invention.

Figure 9 is a fragmentary longitudinal elevational and sectional view of the form of the invention shown in Figure 10.

Figure 1:
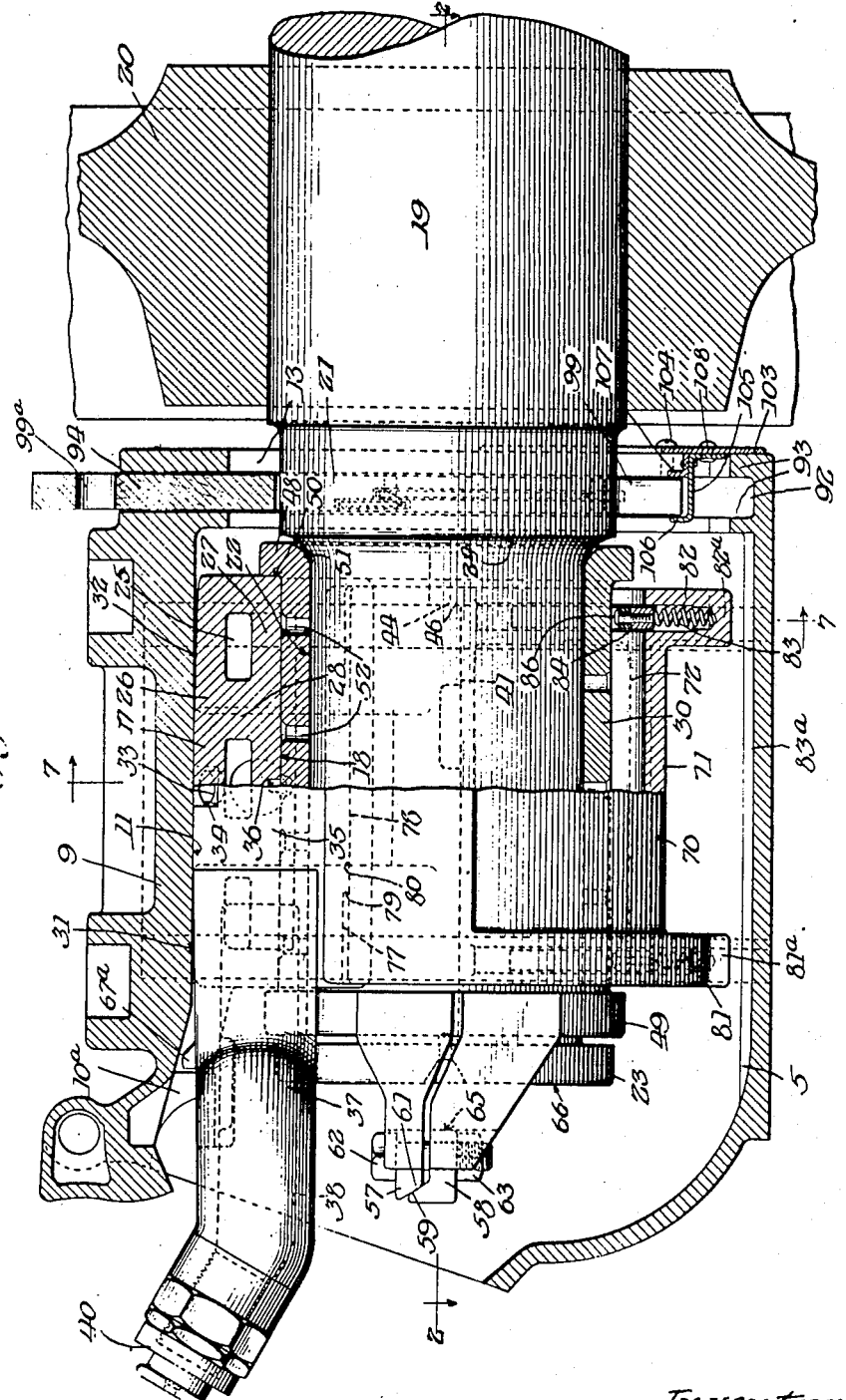
Figure 1 is a longitudinal vertical sectional view of a journal box and journal bearing incorporating improvements of this invention.

The broadly novel improvements of the present invention are described and claimed in my application, Serial No. 622,692, filed July 15, 1932, Patent No. 2,072,168, issued March 2, 1937, and the present invention and application are directed toward improvements and modifications of the structure disclosed in the aforesaid application, together with other modifications.

Referring now more particularly to the drawings, a standard type of journal box or housing is shown at 5.

This housing 5 is of the standard A. R. A. construction, suitably modified to receive the novel bearing structure of the present invention. It will be understood that the invention, as shown in the drawings, is for a substantially original installation, but that relatively few changes are necessary in a standard A. R. A. journal box in order to render the same capable of receiving the improved features of this invention.

Among the outstanding improvements of the present invention are the provision of an improved arrangement of the floating bushing sections and wedge means for clamping same about the journal; the provision of an improved arrangement of the shield for protecting the bushing together with improved packing means therefor; the provision of an improved means for mounting the shield in operative position. It will be understood that these improvements go hand in hand with the general assembly to facilitate installation and to afford desirable clearances for the various parts in operation.

This invention also includes improvements in liquid lubricant feeding means whereby lubricant in a substantially liquid form rather than in a solid or grease like form may be constantly supplied to the moving parts of the journal and bearing in operation.

The box 5 is composed of the longitudinal vertical side walls 6, whose lower edges are extended as at 7, to provide reinforcing portions co-operating with vertical external lugs 8, in spaced relation, said lugs being so arranged as to serve to embrace the spaced legs forming the pedestal jaw of the truck frame (not shown) provided for receiving the journal box. The top 9, of the box may be of the conventional form required to fit different styles of truck frames. The external configuration of the box will, it will be understood, be subject to variation in accordance with the type of truck to which the box is to be applied, and does not essentially enter into the present invention. In some cases the box might even be cast integrally with the truck frame, a common practice in the case of freight cars and other trucks.

The inner surface of the top wall 9, indicated at 11, is substantially flat and the inner surface of the side walls 6 are provided, as in standard practice, with the vertical abutments 12, it being understood that these abutments are to be found in the conventional journal box now in common use, and serve the purpose of forming retaining abutments for preventing the wedge or bearing member, within limits, from sliding longitudinally in the box, and also serve to take lateral thrust. These abutments perform substantially the identical function in the present invention performed by them in standard practice.

It will be observed that the journal box, being of the conventional form slightly modified, is provided with front stops 10a which prevent movement in an outward direction of the bearing block or wedge, as it is termed, designated 17, hereinafter to be described. The vertical abutments 12, generally termed side stops, are recessed at their lower portions, as indicated at 12a, for a purpose which will presently appear.

The wheel end of the box is provided with an opening 13 and, for the purpose of receiving the parts of the bearing structure of this invention, the bordering flange at the bottom of this opening is cut away to a greater extent than is usually found in the standard A. R. A. box.

A portion of the side of the box, indicated at 6a, is cut away to accommodate the lubricating means, as will hereinafter appear.

These are substantially all of the changes required on the standard journal box for adapting the same to receive the bushing structure of this invention.

It will thus be observed that the two front members prevent movement away from the wheel end of the box on the part of the lubricant containing block hereinafter described and that the side stops serve to prevent movement of the block 17 in the opposite direction, that is, toward the wheel, but that in any event there is sufficient clearance provided to permit of a slight endwise movement which is desirable as will hereinafter appear.

It may be well to point out here that the axle 19 carries the wheel, fragmentarily shown at 20, said axle being of the conventional form provided with a reduced portion 21, which is adapted to be engaged by the dust guard to be later described, and a further extended reduced portion 22, which forms the actual journal and is adapted to engage the bearing in the journal box. The outer end of the journal, which is the end remote from the wheel, is conventionally provided with an annular flange 23, the bearing proper lying between the circumferential shoulder 24 and said annular flange, thus in a measure limiting the possible end play or thrust of the journal in the box.

The bearing block 17 referred to above is conveniently provided with a compartment 25, by virtue of the double walls 26 and 27, the wall 27 having an arcuate bearing surface as indicated at 18 to make a running fit on the floating bushing interposed between the same and the reduced portion 22 of the axle.

Within the compartment 25 I provide a plurality of abutments 28, which connect the two walls 26 and 27, thus preventing distortion of these walls due to heat and load.

The wall 27, near the longitudinal straight edges thereof, in each instance is provided with an elongated groove 29, communicating with the lowermost portions of the compartment 25, by the provision of ports 25a, these grooves thus establishing communication between the compartment 25, which is adapted to contain a lubricant, and the adjacent surface of the floating bushing designated 30, and to be more particularly described later.

The bearing block 17 is longitudinaly disposed in the journal box and the upper wall of said block is tapered at its ends as indicated at 31 and 32, similarly to the conventional form of the so-called wedge or the bearing block now employed in journal boxes so that the installation of the bearings 17 in a conventional existing box is thereby facilitated. This tapering also permits of a certain amount of rocking movement of the box on the bearing block with respect to the journal such as becomes necessary to allow for lateral play or swaying of the truck proper, particularly where the box is not spring-mounted on the truck frame. This also allows for displacement due to super-elevation of the track on curves.

The upper wall 26 of the block 17 is provided with threaded apertures 33 closed by suitable plugs, these apertures being disposed with their longitudinal axes on radii described from the center of the axle, that is to say, from the center of the aperture to the inner surface of the block wall 27. The upper wall 26 is suitably recessed as indicated at 34 to accommodate the heads of the closing plugs.

It will be observed that the block 17 has its longitudinal walls 35 disposed between and adjacent to the internal abutments 12 within the journal box, so that substantial transverse movement of the block is effectually prevented, although the desired rocking movement due to the tapered ends may take place. The bearing surface 18 of the wall 27 of the block is provided with one or a plurality of transverse grooves 36 which communicate with the longitudinal grooves 29 previously described, thus an adequate distribution of the lubricant contained within the chamber 25 is had at all times on the arcuate bearing surface 18 of the block 17.

For the purpose of introducing lubricant into the chamber 25, I provide a neck portion 37 having an internal conduit 38 which extends through a suitable aperture 6a in one of the walls of the journal box. Where the device of this invention is inserted into an existing journal box, the upper right hand portion of one of the side walls may be removed to receive the neck 37.

On the outer end of the neck 37, I provide any suitable means for forming connection with a grease gun or the like, such, for example, as a standard grease connection known to the trade as an Alemite connection, and indicated at 40. This arrangement permits of the introduction of relatively hard grease into the chamber for lubricating the bearing.

The floating bushing 30, previously generally referred to, is preferably made in two half sections, although it may be understood that this bearing may be made in more than two sections if desired. At 41—41 in Figures 1, 3 and 7 the bushing sections are shown cut to form the two half sections 42 and 43. Each of the two half sections which, for convenience, are cut at substantially diametrically opposite points, are provided with complemental recesses 44 and 45, complemental projections 46 and 47 being provided for engagement in the recesses 44 and 45, respectively.

Thus, when the two sections of the floating bushing are applied to the journal, the projections 46 and 47 on diametrically opposite parts of the bushing will engage in their respective recesses, thus holding the inner or wheel end of the bushing about the journal.

These projections 46 and 47 and their recesses are so proportioned as to size and angularity of surface that upon tightening of the clamping means hereinafter described, the two sections of the bushing will be brought into substantially transverse alignment as shown in Figure 1 of the drawings.

The ends of the bushing are provided with circumferential radial flanges 48 and 49, which in the case of the flange 48 serve to engage the adjacent end surface 50 of the block 17 and at the same time to form a thrust bearing for engagement at times with the shoulder 24 on the journal, the flange 48 being appropriately beveled or curved as at 51 to facilitate such engagement.

The opposite end flange 49 lies inside of the flange or collar 23 which is found on substantially all journals.

In order to insure a complete distribution of lubricant over the internal and external bearing surfaces of the bushing, the latter is provided with a plurality of apertures 52 which have their outer ends countersunk or flaring so as to facilitate the reception of lubricants from the grooves in the bearing surface 18 of the block 17. In this manner a thorough distribution of lubricant is obtained as the bushing rotates.

Another advantage of countersinking the outer ends of the apertures 52 in the rotating bushing is that the actual area of contact between the bushing and the bearing block 17 is reduced so that the tendency for heating of the bearing under heavy loads is materially reduced. The number of apertures provided and the size of the countersunk portions thereof can be best determined in connection with bearings for various purposes and depending on the degree of maximum load to which the bearing is to be subjected and whether it is to be used in high-speed service or not.

In order to bring the two sections of the bushing into snug engagement with the journal so that there will be no chatter or lost motion between the two, I provide connecting and adjusting means on each of the bushing sections. These means are preferably in duplicate at substantially diametrically opposite points so that an accurate and proper adjustment can be obtained from without the journal box.

The connecting means referred to in each instance conveniently includes, as best shown in Figures 1, 2, 3, 5 and 6, longitudinally extending lugs 55 and 56 which are complemental to each other on the half sections 42 and 43. The outer ends of the lugs 55 and 56 are angularly offset as indicated at 55a and 56a on Figure 2 and provided with abutment portions 57 and 58, the abutment portion 57 having a beveled face 59, and the abutment 58 being provided with an inwardly directed lug 60 having an inclined or beveled face 61 adapted to engage the complemental face 59 on the abutment 57. The two abutments are provided with complemental apertures which are adapted to be in alignment when the sections are placed about a journal, and a retaining and clamping bolt 62 having a retaining nut 63 passes through the apertures in the abutments. By tightening up on the nut 63, the two half sections are brought into snug rotating engagement with the journal. At the same time these two sections will have a relative longitudinal movement so that the lugs 46 and 47 will properly engage the respective recesses 44 and 45. Thus, the two half sections of the bushing are clamped about the journal. The angular offsets 55a and 56a not only place the clamping bolt 62 in a readily accessible position for adjustment but also afford a spring effect when the bolt 62 is tightened which compensates for wear in the bushings and keeps the sections snugly clamped together.

Inasmuch as the wedge surface 18 has the same degree of curvature as the bushing sections 42 and 43, and, furthermore, as it is necessary that the box be jacked up off the axle in order to insert or remove the bearing wedge 17, the outside curvature of the annular flange 49 is described about a center offset with respect to the common center of the axle, bushing and arcuate surface of the bearing block with a diameter slightly less than the curvature of the surface 18 of the bearing wedge 17. Thus, when the axle is dropped down or the box jacked up, the necessary movement to permit of the insertion or removal of the bearing wedge block 17 is materially reduced, and the lower ends, 18a, 18a, of the bearing surface 18 will thus more readily clear the ends 63 of the annular flange portions 49.

In the arrangement of clamping lugs 55 and 56 and their respective abutments, as shown, a greater clearance between the inner edges 65 of these abutments and the outer surface 66 of the journal collar 23 is afforded, allowing for end play of the journal on the brass or bushing. Furthermore, by this construction the retaining bolts 62 and the associated parts are brought closer to the center of the box, and thus, in rotating, do not require that any part of the cover be removed or that the cover plate, not shown, be revised.

It will be understood that the lugs 55 and 56 and their abutment members, together with the retaining bolts, are duplicated at diametrically opposite points as shown in Figure 3 so that, by an adjustment of the nuts in each case, an accurate alignment of the bushing about the journal may be accomplished.

Reverting now to the block 17, in order to limit the distance to which the same may be moved into the journal box, I provide lugs 67 and 68 on the side walls of the block which at times serve to abut the side stops 12 and thus limit the longitudinal movement of the block in the journal box in one direction. The block 17 is also provided with projections 67a, which are adapted to engage the front stops 10a at times for limiting endwise movement of the block away from the wheel end of the box.

In order to form a protecting shield for the rotating bushing and to prevent the loss of lubricant due to the centrifugal action when the bearing is rotating, I provide a grease-retaining and protecting shield generally designated 70. This shield is provided with a partially cylindrical portion 71 having a curvature substantially described about the center of the journal but of greater diameter than the bushing so that there will be maintained a space, indicated at 72, between the arcuate portion 71 and the adjacent surface of the bearing bushing.

The shield itself does not, in ordinary operation, contact with the bushing and, in the construction of my prior application, a space was left between the bushing and the shield which permitted the escape of lubricant and also the ingress of dust and other foreign matter. In the present instance, while the space between the bushing and the shield is relatively large, I provide special packings for preventing the escape of lubricant from the shield and also preventing the ingress of dust or other foreign matter.

The shield is detachably connected to the bearing block or wedge 17 and, for this purpose, the opposite ends of the curved portion 70 are extended in substantially straight portions 73, 73. These portions 73 are, on their inner surfaces, provided with longitudinal grooves 74, the top walls of these grooves, indicated at 75, being inclined upwardly so as to form a ledge or shoulder with an inclined face. The straight portions 73 lie in the recesses 12a in the abutments 12, but sufficient clearance is allowed to permit an upward movement of the shield end walls 73 at times.

The ends 18a of the bearing surface 18 are extended to form lateral flange 76, 76, said flange 76 being provided with inclined upper surfaces 77, 77 which are complemental to the surfaces 75 and are adapted to receive these surfaces when the shield is supported in place as shown in Figures 3 and 7.

The inclined surfaces 75 and 77 do not extend the full length of the respective elements on which they are formed but, in the case of the surfaces 77, these extend from opposite ends of the flanges 76 inwardly about one-fourth of the length of said flanges, leaving a recess 78 affording shoulders 79 on each of the said flanges 76. Complementally, the ends 73 having the surfaces 75 on the shield, are similarly formed so that they have intermediate rectangular portions 80 adapted to drop into the recesses 78 and engage the shoulders 79, thus preventing endwise movement of the shield with respect to the wedge when in assembled position. The grooves 74 are made sufficiently wide to permit of the lifting movement of the shield to facilitate sliding the same on to and off of the wedge 17. Any tendency for the wedge to lift in service with respect to the bearing block 17 is limited by the abutment walls of the recesses 12a and by the spring actuated packing elements which I will now proceed to describe.

The shield 70 adjacent to its ends is provided with enlarged marginal downwardly extending flange portions 81 and 82. Each of these portions 81 and 82 is provided with a crescent-shaped groove 83, this groove extending, as best shown in Figure 7, from just below the horizontal center line of the journal through a substantial half circle to the opposite side of the bushing. Within each of the grooves 83 I provide a crescent-shaped packing 84 which is made in two sections complementally recessed as at 85, and secured together by a small retaining screw 86. The packing sections 84 are generally crescent-shaped, their opposite free ends 87 being tapered so as to fit snugly about the bushing sections as they rotate and between the surfaces thereof and the adjacent ends 88 of the grooves in each instance.

Beneath each of the crescent-shaped packings I provide helical springs 89 having their lower ends seated in sockets 90 formed in the bottom of the grooves or channels 83, said springs acting on the packings to force the same into snug engagement with the adjacent surfaces of the rotating bushing. The heads of the screws 86 are countersunk so as not to come in contact with the surfaces of the floating bushing.

The crescent-shaped packings 84 are preferably formed of a durable metal so that frequent renewal of the packing members is not necessary.

The flanges 81 and 82 in each instance are provided with abutments 81a and 82a which are adapted to contact with a longitudinal rib 83a formed in the bottom of the journal box for a purpose which will presently appear.

A dust guard is placed at the wheel end of the journal box and which may conveniently comprise an upper portion 94 and two lower portions 99. In the journal box there is provided, at the wheel end thereof, a pair of vertical channels or recesses 91 which are connected at their bottoms by a curved channel 92.

In view of the provision of the flanges 81 on the shield and the abutments 81a and 82a, I find it necessary, for the purpose of facilitating the insertion of the shield into the box, to remove a portion of the curved walls 93 of the arcuate groove 92, but aside from this slight modification, this portion of the journal box remains standard construction.

Inasmuch as the lower flanges 93 have been reduced in depth, as hereinabove explained, I have provided a supporting bracket construction including an arcuate closing plate 103 secured to the outer flange 93 by the provision of screws 104. At the middle portion of the arcuate plate 103 I provide a bracket composed of the angularly bent member 105 which extends beneath the adjacent ends of the lower sections 99 of the dust guard, the inner end of the bracket 105 being bent upwardly, as at 106, and said bracket having a lug 107 riveted thereto forming a substantially U-shaped retaining member bridging the junction between the two sections 99 and thus preventing their longitudinal displacement along the axle at this point. The bracket 105 may be riveted, as at 108, to the inner surface of the plate 103.

In assembling the parts of the improved bearing of this invention in a standard journal box the shield is deposited in the box and held at about the medial portion thereof, resting in the bottom of said box. The box, together with the shield, may then be applied to the axle and then the bushing sections 42 and 43 applied to the axle by introducing them through the front of the box. To introduce these bushing sections it is convenient to first apply one section from the top rotated into the lower position and then apply the other section to the journal. At this time the bolts 62 may be inserted and their nuts 63 tightened up to bring the two sections of the bushing into rotating engagement with the journal. It will be kept in mind that the box is, during this procedure, mounted on a suitable jack. By lifting on the jack, the box will be raised bringing the shield packing elements 84 into engagement with the adjacent surface of the bushing. By sufficiently raising the shield, the upper ends of the side walls 73 will be raised sufficiently to permit of the insertion of the wedge. The wedge may be inserted from the front of the box, and, as there is sufficient clearance between the top 9 of the box and the outer flange of the bushing sections indicated at 49, the wedge will be inserted over said flange until it rests upon the adjacent bushing section. While inserting the wedge, the flanges 76 thereof ride beneath the top walls 75 of the side walls 73 of said shield in the grooves 74 provided for that purpose. After the wedge has thus been introduced so that the abutments 67a are in past the front stops 10a, the jack is released so as to lower the box on to the wedge. This lowering action drops the shield down so that the shoulders 79 engage back of the complemental abutments formed on the flanges 76 of the wedge, thus supporting the brass in position. The brass will not refuse to descend into the proper position, inasmuch as the packing elements 84 under the action of the springs 89 will assure the downward movement of the shield under these conditions. The box is then ready to receive the side arm members of the yoke on the truck frame which is not shown. In disassembling the parts, the procedure described above may be reversed.

After the box has been applied, as described above, to the journal, together with the shield and bushing portions and the wedge member, the dust guard may be put into place. It will be understood, of course, that prior to applying the box containing the shield and bushing to the journal, the closure plate 103 is applied in operative position. This plate cannot be applied before introducing the shield into the box, for obvious reasons.

Referring now more particularly to Figures 8 and 9, the essential features of the rotating bushing type of journal are here disclosed together with an improved arrangement of the journal box for containing a liquid lubricant, together with improved means for applying lubricant to the rotating bushing, journal and bearing when in operation.

I am well aware that it has been proposed to lubricate journals by the provision of an auxiliary rotating means for supplying liquid lubricant thereto, and in the present invention, therefore, I claim the novel arrangement of the liquid lubricant supply means whereby impetus is given to the supply means directly from the rotating bushing, and this is illustrated in the said Figures 8 and 9.

Here I provide a journal box 110 somewhat similar in construction to the box already described but modified to afford a lubricant containing cellar 111, at the bottom thereof, said lubricant containing cellar being appropriately formed with a baffle or dam 112 adjacent to the rear end of the box and said cellar at the forward end of the box having a complemental dam 113. A pair of baffles 114, are provided in the cellar 111, upstanding from the bottom wall 115 for preventing undue splashing of the lubricant, and also to permit of the flow of lubricant back and forth through the bottom of the journal box as it is delivered to and returns from the bearing.

The forward or outer end of the journal box is provided with an opening 116 closed by cap 117 having a packing gasket 118 for preventing the escape of lubricant and also preventing the ingress of dust and other foreign matter.

The cap or closure 117 extends adjacent to the forward dam 113 and is retained in locked closed position by the provision of a retaining bolt 119 having a nut 120, the latter underlying the lug 121 formed on the journal box, the head of the bolt 119 engaging a complemental lug 122 formed on the closure.

The journal indicated at 123 is of a conventional form similar to that shown on the other figures of the drawings and is provided with an external annular flange 124.

A rotating bushing 125 conveniently formed in two sections 126 and 127 surrounds the journal and may be provided with an engaging lug and recess portions not shown but similar to those indicated at 44 and 46 in Figure 1.

The main difference between the journal bushing 125 and that shown in Figure 5, for example, is that the bushing sections 126 and 127 are provided each with internal linings of babbit or other renewable wear material indicated at 128, it being found that with the oil or liquid type of lubrication such a surface of contact is to be preferred to the direct contact of the brass bushing with the journal. For some purposes the liner 128 may be of a harder metal than the brass, provided that it is not undesirably harder than the material of the journal.

Within the journal box and beneath the top wall thereof, which is enlarged at 130 to form an abutment, I provide a wedge 131. This wedge is provided with recessed portions 132 which serve to reduce the weight and facilitate cooling of the wedge in operation. The wedge is chamfered at its end as indicated at 133 to allow for the slight angular displacement or rocking of the truck frame required in rounding curves and under other similar conditions.

The wedge is formed with its upper surface arranged to engage an inner surface 134 of the journal box top wall and the inner surface 135 of the wedge is arcuate so as to have a running fit with the outer surfaces of the bushing sections.

The forward end of the wedge is provided with a shelf or trough-like arcuate element 136, provided with an elongated aperture 137, and also provided with an outer flange portion 138 preventing lubricant deposited on said trough from flowing over the other edge.

As will be best observed from inspection of Figure 8, lubricant passageways 153 and 154 are provided in the wedge which passageways communicate with opposite ends of the trough 136. Passageways 153 and 154 are in turn connected with apertures 155 and 156 which supply lubricant from the said passageways to the surface of contact between the arcuate portion of the wedge and the rotating bushing.

The two bushing sections are constructed substantially identical at their outer ends with the section shown in Figure 5, that is to say they are provided with the longitudinal extending complemental lugs 139 and 140 secured together by bolts 141, and the lugs 139 in addition are provided with recesses 142 for the reception of lugs 143 formed on the spider structure 144. This spider structure is somewhat of a diamond shape as shown best in Figure 8 and thus forms arms 145 and 146 which are laterally bent at their outward ends inwardly to overlie the shelf or trough 136. The inner ends of the arms are provided with lubricant pickup buckets arranged in complemental pairs, the buckets pointing in different circumferential directions as indicated at 147 and 148.

It will thus be seen that when the bushing in operation rotates it carries with it the spider structure 144 and in turn the buckets dip into the well at the bottom of the journal box and receive a supply of lubricant which flows from the buckets as they pass over the trough and is thus deposited in said trough. This liquid lubricant thereupon by gravity flows in part through the aperture 137 to lubricate the end flange 157 of the bushing thus lubricating the surface of contact between the bushing flange and the wedge.

It will be understood that the lubricant deposit from the buckets on the trough will only in part be delivered to the opening 137, the major part of the lubricant deposited each time flowing down over the trough 136, through the passageway 153 or 154 depending on the direction of rotation of the bushing, thence through the apertures 155 or 156 as the case may be to the rotating bushing.

The bushing sections are provided with a series of apertures 149 by which lubricant can flow into the surface of contact between the bushing sections and the journal. In one direction of rotation the buckets 147 serve the function of distributing the lubricant and in the opposite direction of rotation the buckets 148 serve the same purpose.

Lubricant may be supplied to the cellar 111 by the provision of an aperture 150 provided near the bottom of the journal box anad normally closed by plug 151.

The provision of the liquid lubricant distributing means shown in Figures 8 and 9 is a distinct departure from devices of this character of the prior art known to me in that the buckets are arranged to be operated by the rotating bushing rather than by the journal so that in this manner a regulated supply of the lubricant is accomplished depending upon the rate of rotation of the bushing and the consequent demand for lubrication thereby placed upon the bearing surfaces of said bushing. For example, should the bushing become frozen to the journal and be forced to take most of the load of friction between the wedge and bushing rather than distributing it between the wedge, bushing and journal, then the speed of rotation of the buckets will be increased, thereby increasing the supply of lubricant. Where in normal operation the bushing rotates relatively to the journal as well as to the wedge, the amount of lubricant required to overcome the increased frictional load is reduced and therefore the rate of rotation of the buckets is reduced, thereby automatically regulating the supply of lubricant in accordance with the requirements of the bearing in service. This is wholly distinct from the prior art devices wherein the lubricant feeding means is actuated by the journal inasmuch as in such devices the supply of lubricant is the same at all times, in direct proportion to the rate of rotation of the journal.

I am in the present invention enabled to reduce the amount of lubricant required and thereby increase the life of the bearing and increase the periods of time between refilling with lubricant normally required in operation of such bearings.

Having thus described my invention and illustrated its use, what I claim as new and desire to secure by Letters Patent is:

1. In a journal bearing, in combination, a box or a housing having an opening at one end and adapted to receive a journal, a bearing block in said box, a revoluble floating bushing between the journal and said block, and a lubricant retaining shield below and spaced from said bushing, said shield having packing means engaging said bushing.

2. In a journal bearing, in combination, a box or housing having an opening at one end and adapted to receive a journal, a bearing block in said box, a revoluble floating bushing between the journal and said block, and a lubricant retaining shield below said bushing, said shield having packing means engaging said bushing and yielding resistant means for urging movement of said packing into engagement with said bushing.

3. In a journal bearing, in combination, a box or housing having an opening at one end and adapted to receive a journal, a bearing block in said box, a revoluble floating bushing between the journal and said block, a lubricant retaining shield below and spaced from said bushing and having internal recesses, and packing means carried in said recesses and engaging said bushing.

4. In a journal bearing, in combination, a box or housing having an opening at one end and adapted to receive a journal, a bearing block in said box, a revoluble floating bushing between the journal and said block, a lubricant retaining shield below said bushing and having internal recesses, means for supporting the shield from said bearing block, and packing means carried by said shield in said recesses and engaging said bushing and tending to hold said shield in position suspended from said block.

5. In a journal bearing, in combination, a box or housing having an opening at one end and adapted to receive a journal, a bearing block in said box adapted to contain a lubricant, a revoluble floating bushing surrounding the journal and in contact with the bearing block, and a detachable shield for said bushing supported by said bearing block, and yieldingly mounted packing on said shield engaging the adjacent surface of said bushing.

6. In a journal bearing, in combination, a box or housing having an opening at one end adapted to receive a journal, a bearing block in said box adapted to contain a lubricant, a revoluble floating bushing surrounding the journal and in contact with the bearing block, a shield for said bushing supported by said bearing and surrounding the bushing, lubricant retaining packing means on said shield engaging said bushing, and means extending from said journal box for introducing lubricant into said bearing block.

7. In a journal bearing, in combination, a box or housing having an opening at one end and adapted to receive a journal, a bearing block in said box, a revoluble floating bushing member surrounding the journal and provided with annular end flanges radially extending to receive the bearing block, one of said end flanges having a portion of its outer perimeter described about an arc whose radius is less than that of the bearing surface of said bearing block to facilitate removal of the latter.

8. In a journal bearing, in combination, a box or housing having a lubricant cellar, a journal, bearing, and a floating bushing therebetween all located in said housing, and lubricant elevating means on said bushing adapted to enter said cellar for supplying lubricant to the surfaces of contact of the bearing.

9. In a journal bearing, in combination, a box or housing having a lubricant cellar, a journal, bearing wedge, and floating bushing disposed therebetween all operatively arranged in said housing, and means secured to said bushing comprising buckets adapted to enter said cellar and collect and deliver lubricant to the surfaces of contact of the bearing.

10. In a journal bearing, in combination, a box or housing having a lubricant cellar, a journal, bearing wedge, and floating bushing disposed therebetween all operatively arranged in said housing, and means secured to said bushing comprising radially disposed arms having buckets adapted to enter said cellar and collect and deliver lubricant to the surfaces of contact of the bearing.

11. In a journal bearing, in combination, a box or housing having an opening at one end and adapted to receive a journal, a bearing block in said box, a revoluble floating bushing between the journal and said block, a lubricant retaining shield below said bushing and having internal recesses, and sectionalized packing means carried in said recesses and engaging said bushing.

12. In a journal bearing, in combination, a box or housing having an opening at one end adapted to receive a journal, a bearing block in said box, a revoluble floating bushing between the journal and said block, a lubricant retaining shield below said bushing, means for supporting said shield from said bearing block, and packing means carried by said shield and engaging said bushing to hold said shield in spaced relation with said bushing.

13. In a journal bearing, in combination, a box or housing having an opening at one end and adapted to receive a journal, a bearing block in said box, a revoluble floating bushing member surrounding the journal and provided with annular end flanges radially extending to receive the bearing block, one of said end flanges having a portion of its outer perimeter described about an arc whose radius is less than that of the bearing surface of said bearing block to facilitate removal of the latter, and means for supplying lubricant to the surfaces of contact of the bushing, wedge and journal.

14. In a journal bearing, in combination, a box or housing having an opening at one end and adapted to receive a journal, a bearing block in said box, a revoluble floating bushing member surrounding the journal and provided with annular end flanges radially extending to receive the bearing block, one of said end flanges having a portion of its outer perimeter described about an arc whose radius is less than that of the bearing surface of said bearing block to facilitate removal of the latter, and means for supplying lubricant to the surfaces of contact of the bushing, wedge and journal, in accordance with the rate of rotation of said bushing.

15. In a journal bearing, in combination, a box or housing having an opening at one end adapted to receive a journal, a bearing block in said box, and a revoluble floating bushing surrounding said journal and in contact with said bearing block, said bushing being made in a plurality of separable sections, and means for retaining said bushing sections about the said journal consisting of complemental integral wedge portions of said bushing sections, and connecting means to cause said complemental wedge portions to act upon each other.

WILLIAM HUNTER HECKMAN.